(No Model.) 3 Sheets—Sheet 1.

S. W. PUTNAM.
METAL TURNING LATHE.

No. 525,863. Patented Sept. 11, 1894.

Witnesses

Inventor
Salmon W. Putnam
by A. H. Evans & Co.
Attorneys (No Model.) 3 Sheets—Sheet 2.

S. W. PUTNAM.
METAL TURNING LATHE.

No. 525,863. Patented Sept. 11, 1894.

Witnesses
John Imrie
Chapman H. Fowler

Inventor
Salmon W. Putnam,
by A. H. Evans & Co
Attorneys (No Model.) 3 Sheets—Sheet 3.

S. W. PUTNAM.
METAL TURNING LATHE.

No. 525,863. Patented Sept. 11, 1894.

Witnesses
John Trivie
Chapman Fowler.

Inventor
Salmon W. Putnam,
by A. H. Evans & Co
Attorneys

UNITED STATES PATENT OFFICE.

SALMON W. PUTNAM, OF FITCHBURG, MASSACHUSETTS.

METAL-TURNING LATHE.

SPECIFICATION forming part of Letters Patent No. 525,863, dated September 11, 1894.

Application filed September 8, 1892. Renewed March 10, 1894. Serial No. 503,202. (No model.)

*To all whom it may concern:*

Be it known that I, SALMON W. PUTNAM, a citizen of the United States, residing at Fitchburg, in the county of Worcester and State of Massachusetts, have invented certain new and useful Improvements in Metal-Turning Lathes, as set forth in the accompanying drawings, forming part of this specification, in which—

Figure 1:
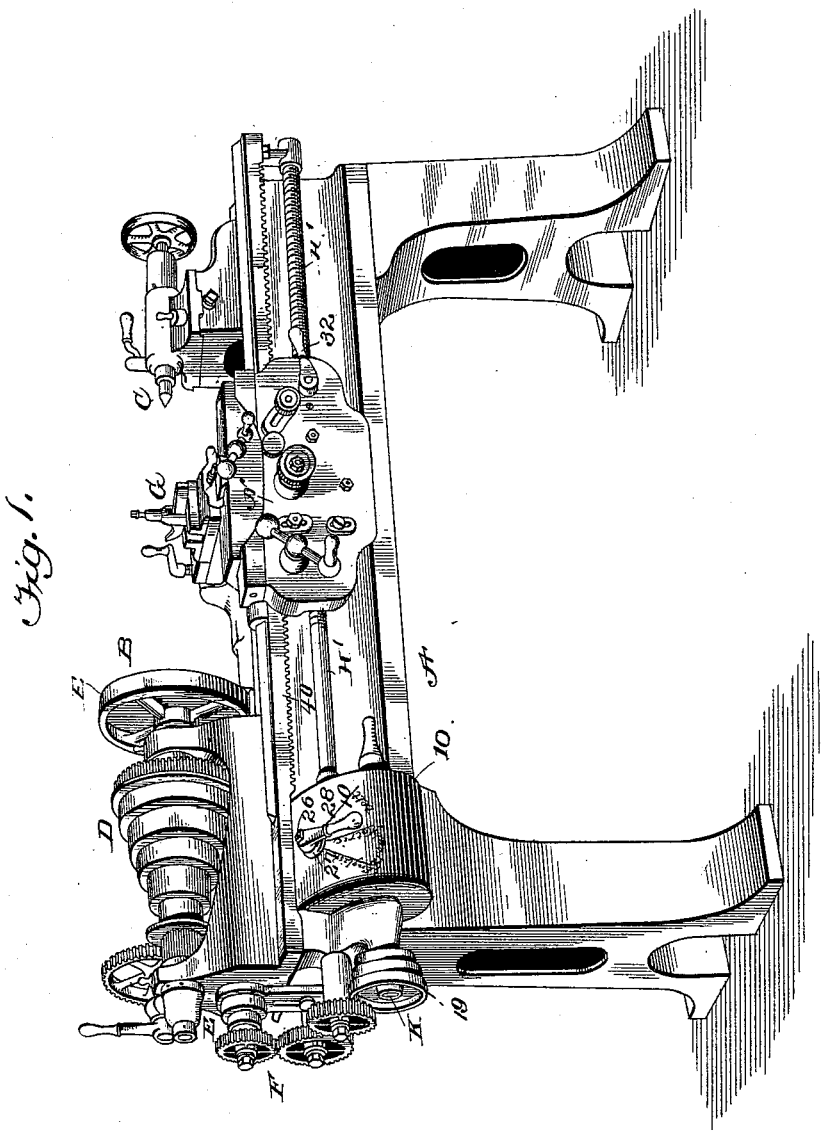
Figure 2:
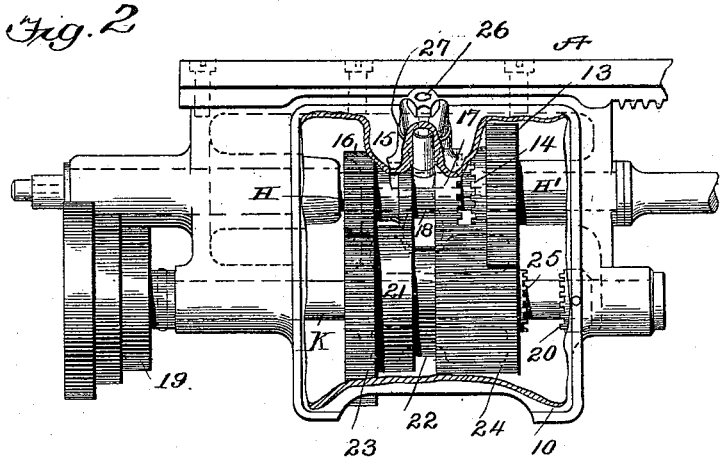
Figure 3:
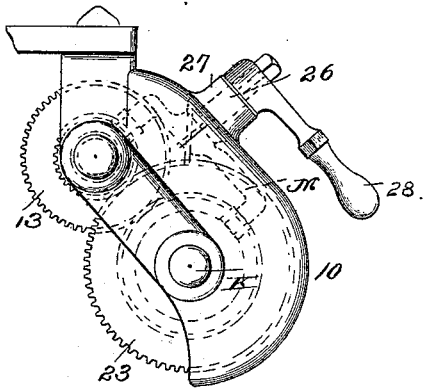
Figure 4:
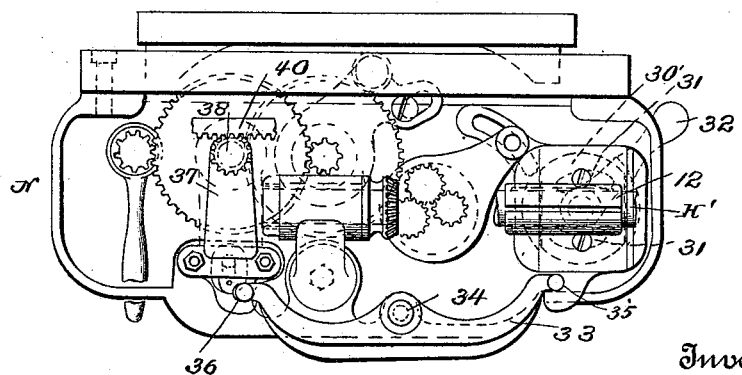
Figure 5:
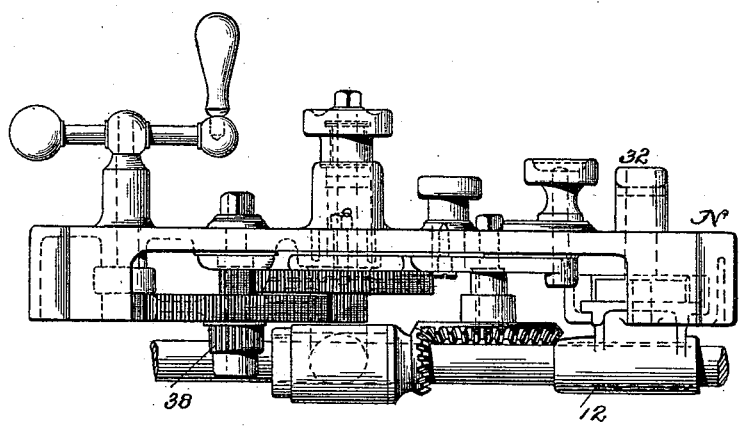
Figure 6:
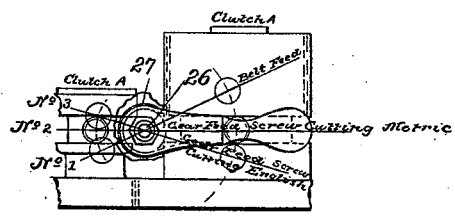
Figure 7:
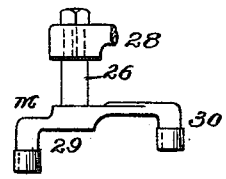

Figure 1, is a perspective view of a metal turning lathe embodying my invention. Fig. 2, is an enlarged side view of the feed mechanism showing part of its hood or casing broken away. Fig. 3, is an end view of the same. Fig. 4, is an enlarged view of the devices for effecting the automatic engagement of the rack pinion with the screw nut. Fig. 5, is a plan view of Fig. 4. Fig. 6, is an enlarged detail of the clutches and the shifting lever. Fig. 7, is a side view of the lever with its yoke.

My invention relates to certain new and useful improvements in lathes especially adapted for metal turning purposes; and it consists of the constructions, arrangements and combinations of parts, which I shall hereinafter fully describe and claim.

The first object of my present invention is to produce a quick, handy and simple means of cutting screw-threads of both the English and metric system, and a new arrangement and combination of coarse and fine gear and belt feeds, all of which are available without stopping the lathe, or the clashing of the various movements.

Another object of my invention is to produce a mechanism whereby an automatic engagement of the rack pinion is effected with the screw nut contained within the feed apron, so that both of these devices are operated and controlled by a single lever or handle.

To enable others skilled in the art to which my invention appertains to make and use the same, I will now describe its construction and indicate a preferred manner of carrying the same out.

For the purpose of clearly disclosing my several improvements, I have shown them applied to a well known form of metal working lathe in which A represents the frame or bed of the machine; B, the head-stock; C, the tail-stock; D, the main cone pulleys; E, the belt pulley; F, the train of gears by which the feeding mechanism is usually operated, and G the tool holder with its adjunctive parts. These features are all common to this form of lathe, and being well known, a further and more detailed description of their construction and mode of operation is thought to be unnecessary to a clear understanding of the present improvements.

The first part of my invention relates, as before stated, to the means by which a quick, handy and simple method of cutting screw-threads of both the English and metric system, and the new arrangement of fine and coarse gears and belt feeds, all of which are available without stopping the machine or deranging the other mechanisms thereof.

Referring now particularly to Figs. 1, 2 and 6 for a more detailed disclosure of this portion of my invention, the frame A of the machine is shown as being formed with or having a hood or casing 10 adapted to contain the mechanism for producing the combined results hereinafter stated. Within this hood 10 the two-part or sectional lead screw H H' Fig. 2, is appropriately mounted, the said screw being splined and serving the double purpose of lead screw and feed rod. Upon the inner end of the section H' of the screw is keyed or otherwise rigidly secured a gear wheel 13 from whose face projects a clutch section 14, while upon the other section H of the screw is a loosely sliding sleeve 15 formed at one end with a pinion 16 and at its opposite end with a clutch section 17 adapted to engage the clutch section 14 to lock the two sections or parts of the lead screw together, the said sleeve having also a circumferential groove 18 for the arm of a suitably disposed shipper or lever to be hereinafter described, and whose purpose is to throw the two clutch sections 14 and 17 into and out of intimate engagement with each other when desired. The cone feed rod K is mounted within the hood or casing parallel with the lead screw, and carries at one end the cone pulley 19, and to this rod within the hood is rigidly secured a clutch section 20.

Upon the cone feed rod K is loosely mounted a sleeve 21 having a circumferential groove 22 for the other arm of the shipper or lever before mentioned, the said sleeve being formed of one piece with the gears 23 and 24 at opposite ends, and with the latter gear (24) formed with a clutch section 25 projecting from its face and adapted for engagement with the clutch section rigid on the rod.

The shipper or lever M heretofore mentioned lies within the front portion of the hood and has its stem 26 fulcrumed within a boss 27 and projecting to the outside so as to receive the handle 28; the said shipper or lever having two arms 29 and 30 carrying antifriction rolls adapted to engage and work within the circumferential grooves 18 and 22 in the sliding sleeves 15 and 21 respectively, and the said hood having its exterior surface designated "English screw feed," "metric screw feed" and "belt feed" as shown in Fig. 6.

From the foregoing construction and arrangement of parts it is manifest that, when the handle 28 is moved to the position marked "No. 1" in Fig. 6, the clutch sections 20 and 25 are in mesh, the gears 16 and 23 and clutch sections 14 and 17 being disconnected and out of mesh. In this position the working feed is obtained by the belt in substantially the usual manner. When the handle 28 is moved to the position "No. 2" (Fig. 6) the relative positions of the several parts are changed, the gears 16 and 23, and 13 and 24 are in mesh, while the clutch sections 14 and 17 and 20 and 25 are disconnected or out of mesh. In this second position the position of the gears named translates the screw cutting feature of the lathe from the "English" into the "metric" system, with the screw nut 12 in the feed apron closed, but when this screw nut is open, this same arrangement of the gearing gives a fine turning feed entirely by gears. When the handle 28 is moved into the position designated "No. 3" in Fig. 6, the clutch sections 14 and 17 are in mesh, and the gears 16 and 23 and 13 and 24 are disconnected or out of mesh, which arrangement and disposition of parts gives the ordinary English system of screw cutting when the screw nut 12 is closed, and a coarse turning feed by gears when the screw nut is open. Thus I am able by this simple arrangement of shifting gears to equip a lathe with a positive, simple and effective means for cutting screw threads of both the English and metric system, to obtain coarse and fine gear feed, and also the usual belt feed; all of these important results being obtainable at pleasure without stopping the machine or interfering with its other operative parts.

The second part of my present invention has reference to an automatic arrangement of the rack pinion and two-part screw nut by whose movement both of these devices are operated and controlled by a single handle; these constructions being especially set forth in Figs. 4 and 5 of the drawings. Upon reference to these figures it will be seen that the feed apron N is of the usual form and contains the usual or any well known train of gearing herein shown generally by N but not specifically described as this gearing, outside of the rack pinion, forms no part of my present invention. The screw nut 12 before mentioned is made of two parts or jaws which embrace the lead screw as shown in Fig. 4 and are connected with a disk or plate 30' having cam slots 31 and guiding bolts, the axis or shaft of the disk having fitted to it a handle 32 (see Fig. 4) the movement of which opens and closes the two parts or jaws of the nut for purposes to be presently stated. In the lower part of the feed apron is a yoke or rocking lever 33 which is centrally hung or fulcrumed upon a stud 34 and has its opposite ends curved upwardly. One of the ends of this rocking yoke is fitted in a socket 35 formed in the lower jaw of the screw-nut, while the opposite end of the yoke is likewise fitted in a socket 36 in the frame or support 37 which carries the rack pinion 38. Now when the parts are properly adjusted, it will be seen that when the handle or lever 32 is turned to one side the cam disk will cause the parts of the screw-nut to separate thereby holding the jaws thereof open. During this movement of the jaws the yoke 33 is caused to rock about its post or fulcrum 34 thereby elevating the opposite end of the yoke and forcing the pinion 38 into mesh with the rack 40. In this position the pinion is in operative contact with the rack and the screw nut is open or disconnected from the lead screw. When the reverse movement takes place, i. e., when the nut is closed by the reverse movement of the lever 32, the opposite end of the yoke which carries the rack pinion is correspondingly depressed and the pinion is disconnected from the rack. It is thus manifest that by means of the single handle 32 and its adjuncts both the rack pinion and screw-nut may be brought into use at any time, but in such a manner that it is impossible to have both engaged at the same time, because as soon as the nut engages the lead screw the pinion is disengaged from the rack, and vice versa. By this means the possibility of breaking the gearing or injuring other parts of the lathe is reduced to a minimum.

Having thus described my invention, what I claim as new, and desire to secure by Letters Patent, is—

1. A lathe, having a lead screw formed of sections adapted directly to engage one with another, and to be disconnected, a shifting mechanism to engage each section of the screw when said sections are disconnected to drive them at varying speeds, and a device engaging both the shifting mechanism and lead screw whereby the movement of said device in one direction connects or disconnects the lead screw sections simultaneously with the change of the position of the shifting mechanism.

2. In a lathe, a lead screw formed of sections the meeting ends of which are adapted to connect one with another, and to be separated, a gear slidable at one side of the lead screw and adapted to engage and operate the members thereof, and a device engaging both the slidable gear and lead screw whereby a movement of said device in one direction connects the lead screw sections so that the sections will operate at a uniform speed, and a movement in the reverse direction shifts the gear simultaneously with the separation of the lead screw sections and permits it to engage the sections of the screw to operate them at different speeds, and thereby change the cutting feature of the lathe from one system of screw cutting to another.

3. In a lathe, a lead screw formed of sections the meeting ends of which are adapted to connect one with another, and to be separated, a slidable double gear engaging the independent sections when they are separated and disconnected, and a device connecting the gear and lead screw for shifting the gear simultaneously with the connection and disconnection of the lead screw sections, whereby the lead screw sections may be given a uniform or varying speed, and the screw cutting feature of the lathe may be instantly translated from the English to the metric system of screw cutting.

4. In a lathe, the combination, of a sectional lead screw the meeting ends of which are adapted to engage and disengage, a gear on each of said sections, a double gear slidable at one side of the lead screw having one of its members to engage a lead screw section when said sections are separated, whereby different speeds may be imparted to said sections, and a device for simultaneously connecting or disconnecting the lead screw sections and shifting of the double gear.

5. In a lathe, the combination, of a sectional lead screw, a shifting mechanism for driving the sections of the screw at the same speed or at different speeds, a shipper in engagement with the shifting mechanism and lead screw for effecting the shifting of said mechanism and the simultaneous engagement or disengagement of the lead screw sections, and a handle exterior of the shipper for operating the same.

6. In a lathe, the sectional lead screw one of whose members carries a gear provided with a clutch section, in combination with a sleeve slidable on the other section of the screw and provided with a clutch section and gear, and an oppositely shifting double gear contiguous to the slidable sleeve and adapted to have its gears mesh with those of the lead screw whereby the lead screw may rotate at the same velocity or at different velocities.

7. In a lathe, the combination of a two part lead screw having a double gear, and clutches, and a feed rod having a slidable double gear and clutches, the gear adapted to be thrown into and out of mesh with the lead screw gears, substantially as and for the purpose described.

8. In a lathe the sectional lead screw one of whose sections has a fixed gear provided with a clutch section, in combination with a sleeve slidable on the other section of the screw having a clutch section adapted to mesh with the clutch of the opposing section, and provided with a gear, and a feed rod having a slidable double gear adapted to be thrown into and out of mesh with the lead screw gears, substantially as herein described.

9. In a lathe, the sectional lead screw and the feed rod, each provided with fixed clutch sections, in combination with slidable sleeves on said screw and rod having intermeshing gears, and clutch sections for engagement with the fixed clutch sections, and a shipper connected with both sleeves and moving them in opposite directions for the purposes herein set forth.

10. In a lathe, the lead screw with its gears, in combination with the feed rod having the fixed clutch section, and a slidable double-gear having a clutch section for engaging the fixed clutch, said double gear adapted to intermesh with the lead screw gears.

11. In a lathe, the two-part lead screw having clutches on the inner ends adapted to engage one with the other, and a gear on the lead screw, in combination with a feed rod at one side of the screw having a longitudinally slidable gear adapted to be thrown into and out of mesh with the lead screw gear whereby a working feed is obtained by belt from the feed rod cone pulley.

12. In a lathe, the screw nut, and the sectional lead screw the sections whereof are provided with large and small gears and clutches, in combination with a feed rod provided with a slidable sleeve having similar gears adapted to mesh with the gears of the lead screw to convert the screw cutting from English to metric when the screw nut is open, and to give a fine turning feed entirely by gears when the nut is closed.

13. In a lathe, the sectional lead screw one section of which is provided with a fixed gear having a clutch section, a sleeve slidable upon said screw having a small gear and clutch adapted to mesh with the opposing clutch section, in combination with a feed rod having a fixed clutch section, a sleeve mounted to slide on said rod and provided with a double gear and a clutch section for engaging the opposing fixed clutch section, a gear on the lead screw connected with the feed gears, a cone pulley on the sleeves of the screw and rod and moving them in opposite directions, whereby the clutch sections and gears are brought into and out of engagement with each other, substantially as herein described.

14. In a lathe the combination of a lead screw and feed rod each provided with sleeves carrying clutch sections and gears, a shipper having arms engaging said sleeves for moving them simultaneously in opposite directions, and a handle on the exterior of the shipper for effecting the throw of the gears and clutches, substantially as herein described.

15. In a lathe, the combination of the lead screw, the divided screw nut thereon having a socket, the rack pinion and rack, a frame or support for the pinion having a socket, a rocking yoke having its ends fitted in the sockets of the screw nut and pinion frame or support, a cam disk connected with the nut, and a handle or lever for operating the same, to throw the nut positively into engagement with the screw, and the pinion positively out of engagement with the rack, and vice versa, substantially as herein described.

SALMON W. PUTNAM.

Witnesses:
H. C. PATCH,
H. J. HARRINGTON.